United States Patent
Fröse et al.

(10) Patent No.: US 8,408,644 B2
(45) Date of Patent: Apr. 2, 2013

(54) HEAD REST FOR A VEHICLE

(75) Inventors: Ernst-Otto Fröse, Solingen (DE); Thomas Dillinger, Wermelskirchen (DE); Alexander Hasler, Düsseldorf (DE)

(73) Assignee: Johnson Controls GmbH, Burscheid (DE)

( * ) Notice: Subject to any disclaimer, the term of this patent is extended or adjusted under 35 U.S.C. 154(b) by 328 days.

(21) Appl. No.: 12/675,112

(22) PCT Filed: Aug. 27, 2008

(86) PCT No.: PCT/EP2008/007028
§ 371 (c)(1),
(2), (4) Date: Jun. 2, 2010

(87) PCT Pub. No.: WO2009/030416
PCT Pub. Date: Mar. 12, 2009

(65) Prior Publication Data
US 2011/0109131 A1 May 12, 2011

(30) Foreign Application Priority Data
Aug. 31, 2007 (DE) .......................... 10 2007 041 496

(51) Int. Cl.
*B60N 2/42* (2006.01)
*B60N 2/48* (2006.01)

(52) U.S. Cl. ............................................. 297/216.12

(58) Field of Classification Search ............. 297/216.12, 297/216.1
See application file for complete search history.

(56) References Cited

U.S. PATENT DOCUMENTS

| 2005/0077762 A1* | 4/2005 | Kraemer et al. | 297/216.12 |
| 2006/0279114 A1* | 12/2006 | Toda et al. | 297/216.12 |
| 2007/0257528 A1* | 11/2007 | Akaike et al. | 297/216.12 |
| 2008/0272631 A1* | 11/2008 | Hartlaub | 297/216.12 |
| 2009/0315370 A1* | 12/2009 | Hartlaub | 297/216.12 |
| 2010/0244510 A1* | 9/2010 | Schmitz | 297/216.12 |

FOREIGN PATENT DOCUMENTS

| DE | 19941712 C1 | 10/2000 |
| DE | 697 18 649 T2 | 9/2003 |
| DE | 10348939 B3 | 1/2005 |
| DE | 102004016474 B3 | 8/2005 |
| DE | 102005052766 B3 | 3/2007 |
| DE | 102006001143 B3 | 4/2007 |
| EP | 0916549 A1 | 5/1999 |

OTHER PUBLICATIONS

German Examination Report dated Mar. 6, 2008 as received in corresponding German Application No. 10 2007 041 496.1, 2 pages.
International Search Report corresponding to PCT/EP2008/007028, dated Mar. 13, 2009, 3 pgs.

* cited by examiner

*Primary Examiner* — Milton Nelson, Jr.
(74) *Attorney, Agent, or Firm* — Foley & Lardner LLP

(57) ABSTRACT

A head rest for a vehicle seat has at least one first section of the head rest that is oriented towards the head of the seat occupant, a second section, a third section, and a blocking device in which the second section is arranged essentially between the first and third sections. The first section can be displaced, due to the relative displacement of the second section, from a working position into a safety position and a comfort position. The blocking device blocks or minimizes the displacement of the first section of the head rest. The blocking device is asymmetrical in relation to a central plane of the head rest and can be actuated by an actuation element that is arranged symmetrically in relation to the central plane.

13 Claims, 6 Drawing Sheets

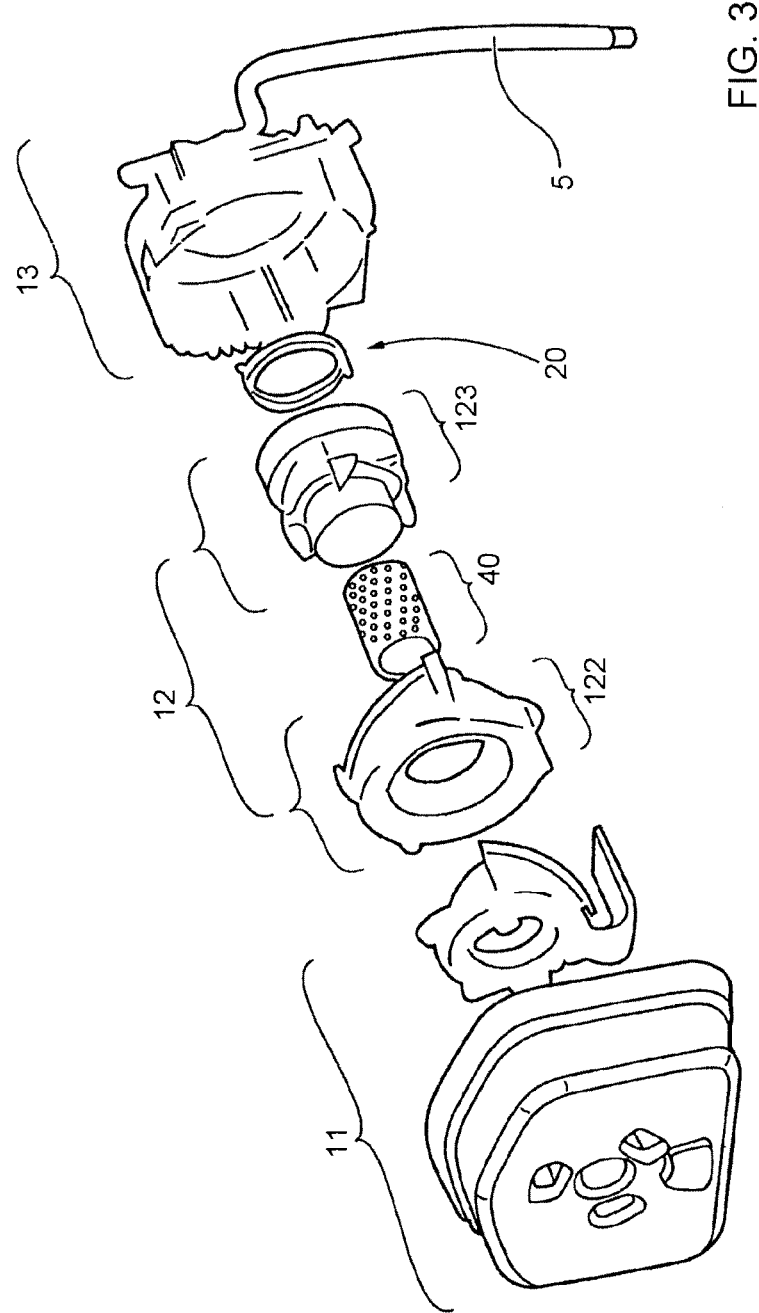

HEAD REST FOR A VEHICLE

CROSS-REFERENCE TO RELATED APPLICATIONS

This is a National Stage application of PCT/EP2008/007028, filed Aug. 27, 2008, which claims the benefit and priority of German Patent Application No. 10 2007 041 496.1, filed Aug. 31, 2007. The foregoing applications are incorporated by reference herein in their entirety.

The invention relates to a headrest for a vehicle seat in which, in the event of an accident, at least one section of the headrest that is oriented towards the head of the seat occupant may be displaced, due to the effect of a drive device, from a working position into a safety position in the direction of the head of the seat occupant.

BACKGROUND

A headrest is disclosed in the publication DE 10 2004 016 474 B3, in which sections of the headrest are moved apart in a telescopic manner, in order to adopt a safety position of the headrest. Moreover, a headrest for a vehicle seat is disclosed in the publication DE 103 48 939 B3 in which, for reasons of comfort, the headrest is adjusted according to a movement sequence, and a further movement sequence being performed when, in the event of an accident, the headrest is transferred from its normal position into a protective position. An active headrest which is adjustable in a linear manner is disclosed in the publication DE 10 2005 052 766 B3. Moreover, a headrest for motor vehicle seats is disclosed in the publication DE 697 18 649 T2, in which a pair of push buttons for actuating an adjusting device of the headrest may be actuated from outside and in each case are individually able to move a slider member.

SUMMARY

The object of the invention is to provide a headrest with a drive device which is effective and of simple and compact design, which in a normal situation of use ensures optimal operability and optimal comfort, in particular optimal comfort even during the adjustment process and in the event of an accident ensures optimal safety for a seat occupant.

The object is achieved by a headrest for a vehicle seat in which, in the event of an accident, at least one first section of the headrest that is oriented towards the head of the seat occupant may be displaced, due to the effect of a relative displacement of a second section of the headrest that is arranged substantially between the first section and a third section, from a working position into a safety position and a comfort position in the direction of the head of the seat occupant, in a direction of displacement, a blocking device for blocking or minimizing displacement of the first section of the headrest counter to the direction of displacement being provided, the blocking device being provided to be asymmetrical in relation to a central plane of the headrest extending substantially in a vertical and parallel manner in relation to the direction of displacement in the built-in position of the headrest and able to be actuated by means of an actuation element which is able to be arranged symmetrically relative to the central plane. As a result, according to the invention the advantage is achieved that the actuation element with the same design of two different headrests and/or a pair of headrests—i.e. in an asymmetrical arrangement relative to the central plane of the different sections constituting the two headrests in the inside—may be arranged such that, in the case of the one headrest of the headrest pair, the actuation element is arranged on the left-hand side of the headrest and that, in the case of the other headrest of the headrest pair, the actuation element is arranged on the right-hand side of the headrest. As a result, the number of parts for all the parts to be arranged inside the headrest and, thus the essential parts, may be duplicated and, therefore, the production costs of a headrest thus provided may be reduced. In the case of a so-called active headrest according to the invention, i.e. a headrest which is capable of moving forward a headrest part facing toward the head of a seat occupant, such a functional integration—i.e. an adjustability with a simultaneous symmetrical arrangement and/or ability to arrange the actuation elements and/or the actuation element, is a particular challenge when considering the capacity of the installation space which is always small.

According to the invention it is preferred that the actuation element is provided as a pressure actuation element, in particular a push button. As a result, a particularly simple, user-friendly embodiment is provided which is particularly safe and/or prevents injuries with regard to an accident situation and the risk of injury on hard and/or protruding parts of the headrest.

Furthermore, according to the invention it is preferred that the blocking device has at least one blocking pin which may be actuated by the actuation element for the purpose of unblocking the blocking device, for actuating the blocking pin, in particular, a movement of the blocking pin being provided substantially counter to the direction of displacement and, in particular, the blocking pin in the normal case being provided preloaded by a spring for the purpose of blocking the blocking device. As a result, in a simple and yet secure manner a possibility of blocking is provided such that, after activating the safety mechanism of the headrest, the first section is no longer pushed back, or at least no longer substantially pushed back, in the direction of the working position.

According to the invention, it is further preferred that the movement of the blocking pin is provided by the actuation element by means of an oblique surface mechanism. As a result, in a particularly simple manner a robust mechanical connection is possible between the blocking pin and the actuation element.

Furthermore, according to the invention it is preferred that the relative movement of the sections is a rotation about a rotational axis substantially parallel to the direction of displacement. As a result, a particularly simple and robust displacement of the first section is possible in the direction of displacement.

Moreover, according to the invention it is preferred that the first section has at least one first oblique surface and the second section has at least one second oblique surface and/or that the third section has at least one third oblique surface and the second section has at least one fourth oblique surface, at least one part of the oblique surfaces extending substantially helically about the rotational axis and with a relative movement of the second section about the rotational axis effect a movement of the first and/or second section in the direction of displacement. As a result, firstly a particularly effective transfer of the rotational movement of the second section is effected into a translational movement of the first section and secondly by the provision of two oblique surface pairs (namely between the first section and the second section, on the one hand, and between the second section and the third section, on the other hand) with the same rotational angle of the rotational movement of the second section an enlargement of the translational movement of the first section in the direction of displacement may be effected by an opposing arrangement of the oblique surface pairs.

According to the present invention, it is further preferred that the first and second oblique surfaces act on both sides and/or the third and fourth oblique surfaces act on both sides. As a result, it is possible that a relatively well-defined rotational and/or rotational and translational adjustment of the second section of the headrest corresponds substantially to each translational adjustment of the first section of the headrest. In particular, as a result, it is possible according to the invention that the headrest may be returned again in a simple manner after activation (i.e. after the adjustment of the safety position).

Moreover, it is preferred according to the invention that the blocking device has teeth in the region of the third oblique surface and the fourth oblique surface. As a result, according to the invention it is firstly possible that, in spite of the possibility of adjusting the comfort, a reliable blocking of the headrest is possible in the safety position. Secondly, it is possible that adjusting the comfort of the headrest in the horizontal direction—i.e. a displacement of the first section in the direction of displacement or in the opposite direction for the purposes of comfort—is possible in a simple manner by an actuation element being pressed for moving the headrest and/or the first section of the headrest counter to the direction of displacement, and that a desired displacement of the headrest and/or of the first section of the headrest toward the direction of displacement is possible without an actuation of an actuation element and a displacement is possible in spite of the engagement of the teeth.

It is particularly preferred if the second section has a comfort section and a safety section, the comfort section being able to be moved away from the position of the safety section, for adjusting the comfort, starting from a position corresponding to the working position of the first section, in particular the fourth oblique surface being provided on the comfort section. As a result, it is possible in a simple manner to implement both a comfort adjustment and a safety adjustment substantially based on the same mechanisms and/or based on the same parts of the headrest.

Furthermore it is preferred according to the invention that the comfort section may be adjusted, for adjusting the comfort, into a position corresponding to the safety position of the first section independently of the position of the safety section. As a result, advantageously for the adjusting range which is accessible for the comfort adjustment, the maximum adjusting range is selected so that such a headrest is able to satisfy particularly high comfort requirements.

BRIEF DESCRIPTION OF THE DRAWINGS

The figures represent by way of example and schematically various embodiments of the invention, in which:

FIGS. 3 to 8 show various embodiments and/or details of the headrest according to the invention.

DETAILED DESCRIPTION

Figure 1:
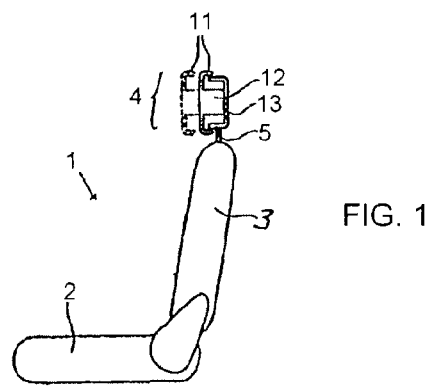
FIG. 1 shows a vehicle seat comprising a headrest.

According to FIG. 1 a vehicle seat 1 according to the invention and/or a vehicle seat 1 provided with a headrest 4 according to the invention comprises a seat part 2 and a backrest 3 connected thereto, in particular in a manner in which the inclination may be adjusted, and which is provided with the headrest 4. Pairs of retaining bars 5 may be provided for fastening the headrest to the backrest 3. However, alternatively other fastening options (not shown) may also be provided between the backrest 3 and the headrest 4. The pairs of retaining bars 5 of the headrest 4 may be connected pivotably in the upper region of the backrest 3 or in the region of the headrest 4 via an articulation (not shown) to the backrest 3 and/or to the headrest 4. According to the invention, the headrest 4 comprises at least one first section 11 of the headrest 4 facing the head of the seat occupant, which as a result of an accident may be displaced under the action of a relative movement of a second section 12 of the headrest 4 arranged substantially between the first section 11 and a third section 13, from a working position (illustrated by solid lines in FIG. 1) toward the head of the seat occupant in a direction of displacement into a safety position (illustrated by dotted lines in FIG. 1). The first section 11 is, in particular, a padded element on which the head of the seat occupant may be rested and/or supported. The third section 13 of the headrest 4 is, in particular, a base body of the headrest 4, which is rigidly connected to the backrest 3 via the retaining bars 5 or also in a manner in which the height and/or inclination may be adjusted. A drive device, disclosed hereinafter in detail and comprising the second section 12, is arranged inside the headrest 4 between the first section 11 and the third section 13, which effects the displacement of the first section 11 in a direction of movement C toward the head of the seat occupant.

Figure 2A:
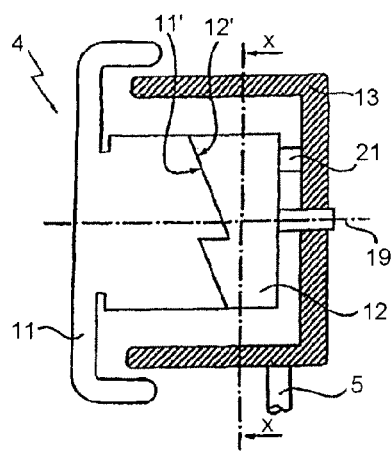
FIGS. 2a to 2d show sections through a drive device which may be inserted into the headrest in various operational positions.
Figure 2C:
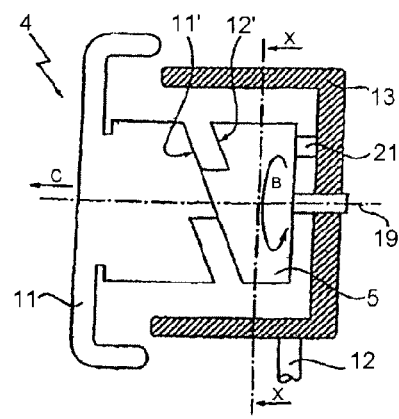
Figure 2B:
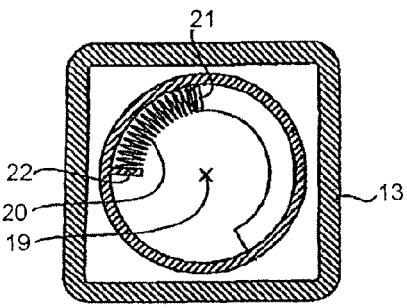
Figure 2D:
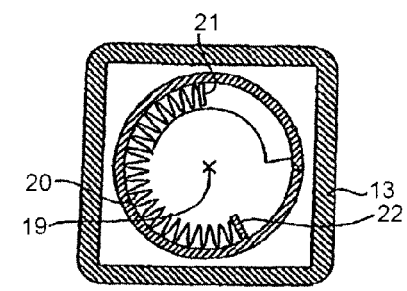

According to FIGS. 2a to 2d, the relative movement of the sections 11, 12, 13 of the headrest 4 according to the invention is shown in more detail schematically. In this connection, FIGS. 2a and 2b show the state of the headrest in the working position and FIGS. 2c and 2d show the state of the headrest in the safety position (displacement of the first section 11 in the direction of the seat occupant, direction of movement C), FIG. 2b representing a front sectional view of the headrest 4 illustrated in FIG. 2a in a lateral sectional view along the cutting line X-X of FIG. 2a, and FIG. 2d representing a front sectional view of the headrest 4 illustrated in FIG. 2c in a lateral sectional view along the cutting line X-X of FIG. 2c. The drive device comprises the second section 12 of the headrest 4, which is connected to the third section 13 and/or base body of the headrest 4 in a rotatable manner about a rotational axis 19. A pretensioned spring 20, shown merely schematically, in the region between two contact points 21 and 22 is—depending on the pretensioning—either able to effect a movement from the working position into the safety position after releasing a locking device, not shown, or to effect a movement from the safety position into the working position (if the movement from the working position into the safety position is carried out by, for example, a Bowden cable drive—for example associated with the presence of an inertia force produced by the seat occupant, for example on the backrest of the seat). In this case, the locking device may be released, for example, by an electromagnetically actuated retaining device or the locking of the pretensioning of the spring may be released by a pyrotechnic device, namely by forcing off a retaining lug or a retaining pin (not shown). In the event of an accident (FIG. 2c, FIG. 2d) the second section 12 is rotated relative to the third section 13 (arrow B). Oblique surfaces rubbing against one another between the first section 11 and the second section 12 and/or between the second section 12 and the third section 13 produce, therefore, an axial force and a forward displacement of the first section 11 parallel to the direction of the rotational axis 19 in the direction of the arrow C (direction of displacement). The front faces of the first section 11 denoted by 11' and/or 12' and facing one another (subsequently also denoted as first oblique surfaces 11') and/or of the second section 12 (subsequently also denoted as second oblique surfaces 12') are configured according to the invention as oblique surfaces such that the rotational movement of the second section 12 is transferred into a translational movement of the first section 11. According to the invention, a blocking device may be provided at this point (i.e. between the first and second oblique surfaces 11', 12') such that a portion or all of said first and second oblique surfaces 11', 12' are provided with—for example sawtooth-like—teeth, which permit a blocking of the first section 11 in its fully extended or partially extended position according to the direction of movement C, when a force acts on the first section 11 moving back said section into the working position (for example after or during an accident, starting from the head of the vehicle occupant). Third and fourth oblique surfaces (not shown in FIGS. 2a to 2d) may either alternatively or in addition to their arrangement between the first section 11 and the second section 12 also be provided between the second section 12 and the third section 13, and alternatively or in addition to the blocking device in the region of the first and second oblique surfaces 11', 12' may have a blocking device of similar design.

According to the present invention, it is provided that the displacement of the first section 11 in the direction of displacement C is possible not only in an accident situation, but also for the purposes of comfort as desired by a user. Thus, apart from the working position, not only the safety position of the first section 11 is possible but at least one comfort position, preferably however a plurality of comfort positions. In this case, according to the invention it is provided, in particular, that the comfort positions are incremental i.e. the adjustment options are not infinite (in other words an unlimited number of comfort settings) but there is a limited number of, for example, between 5 and 50, preferably for example 20 to 30 adjustable comfort positions. According to the invention, it may be provided in this case that starting from the working position the displacement path in the direction of displacement for the purposes of comfort and the displacement path for adjusting the safety position completely overlap or either the displacement path for the purposes of comfort is greater than it is for safety purposes or, in reverse, the displacement path for the purposes of comfort is shorter than for safety purposes. In the embodiment explained below, the displacement path in the direction of displacement for the purposes of comfort and the displacement path for adjusting the safety position completely overlap. This may be implemented according to the invention, for example, such that the second section 12 has a comfort section 122 and a safety section 123, by means of a rotation of the comfort section 122 about the rotational axis 19 starting from the working position or starting from a comfort position a movement of the first section 11 being provided in the direction of displacement C, and by means of a rotation of the safety section 123 about the rotational axis 19 an at least partially combined movement of the comfort section and a movement of the first section 11 being provided in the direction of displacement C. For the sake of a simpler view, however, in FIGS. 2a to 2d neither the safety section 123 nor the comfort section 122 are shown individually.

Figure 4:
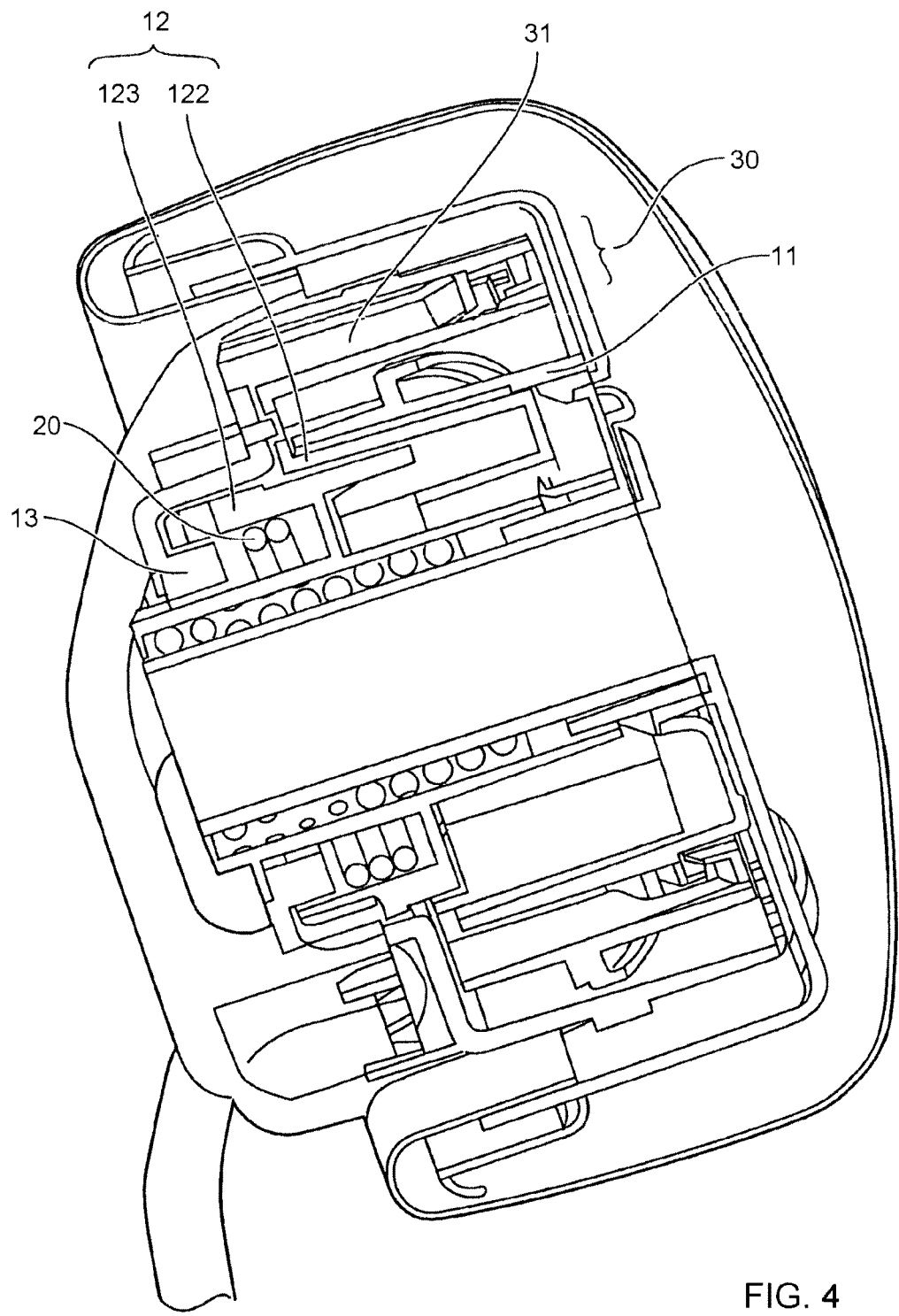
Figure 5:
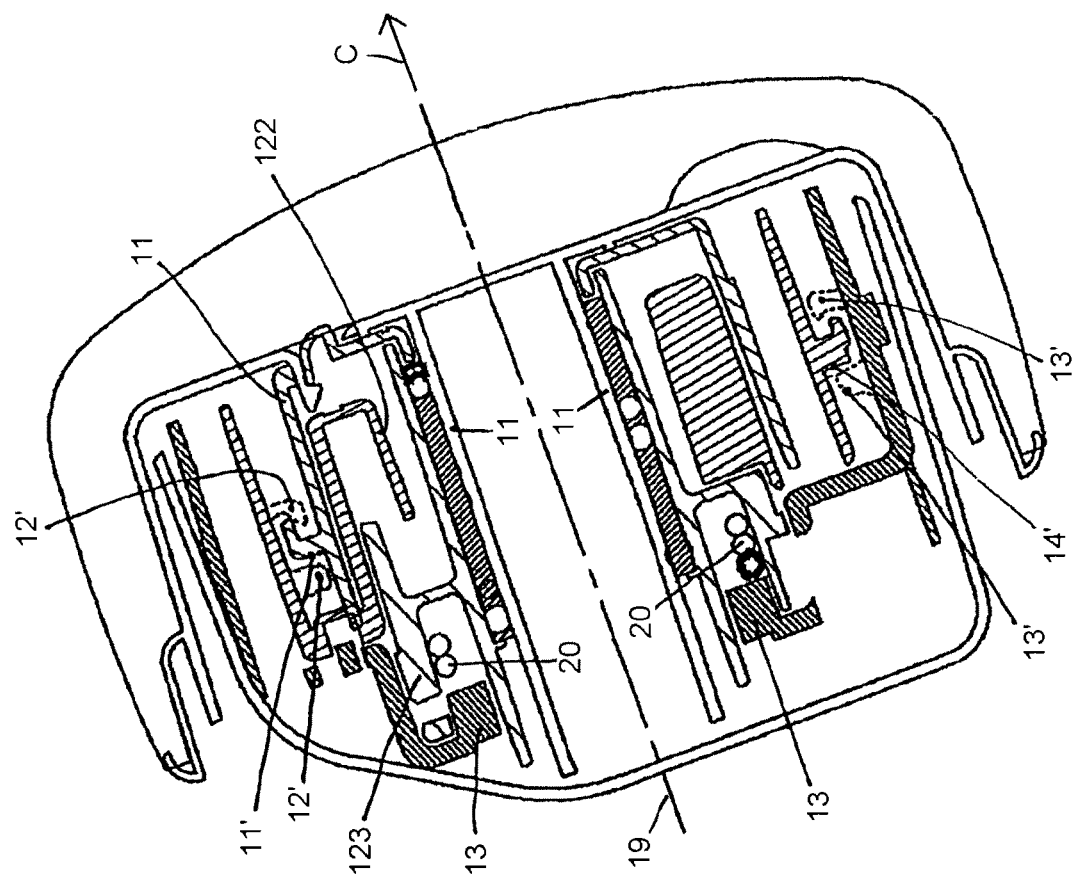
Figure 6:
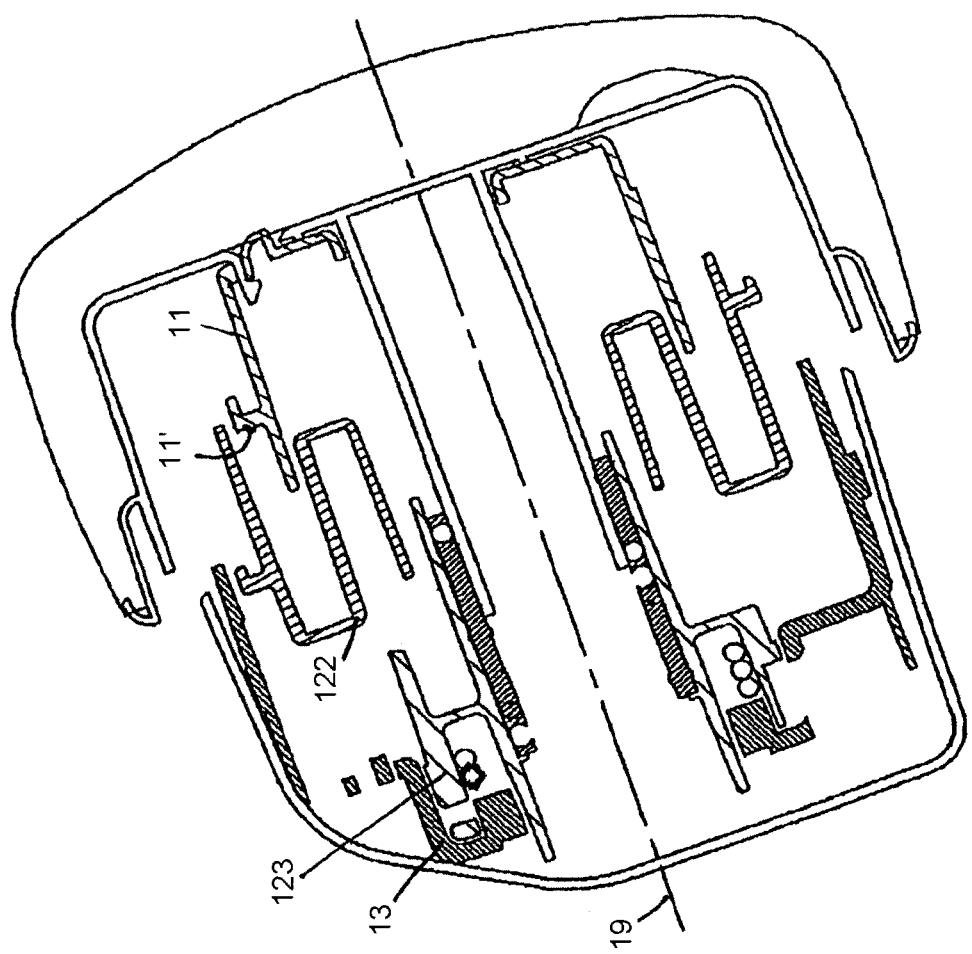
Figure 8:
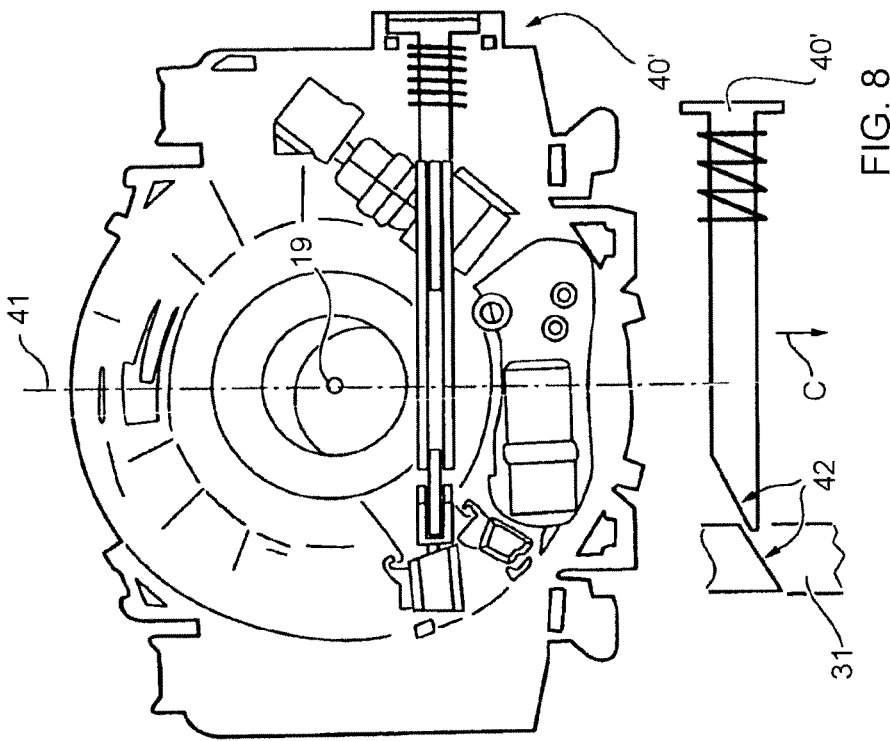
Figure 7:
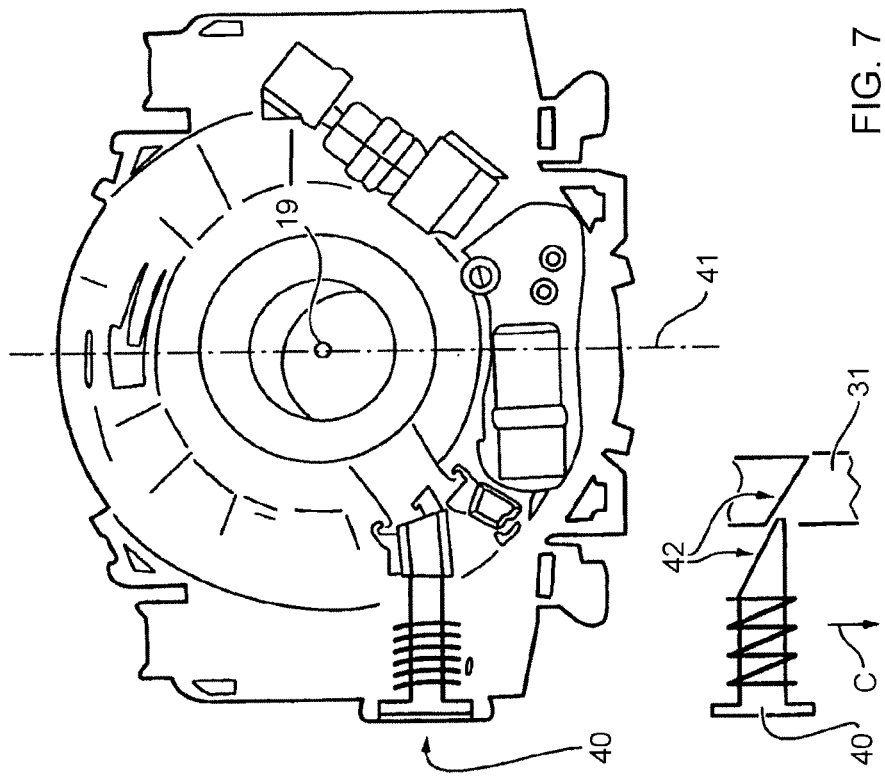

In FIGS. 3 to 8 various views of a headrest 4 according to the invention are shown schematically, in FIG. 3 an exploded view and in FIGS. 4, 5 and 6 a sectional view and in FIGS. 7 and 8 in each case a plan view of the third section of the headrest 4 from a direction in the installed position from the rear being respectively shown. The first section 11, the third section 13, the spring 20 configured as a leg spring 20, the retaining bars 5 for the headrest 4 and the second section 12 with the comfort section 122 and the safety section 123 are respectively shown.

In FIGS. 5 and 6, various settings of the headrest 4 and/or of the first section 11 of the headrest 4 relative to the remaining headrest 4 are shown in sectional view, in FIG. 5 the working position being shown, a (maximum) extended position of the first section 11 for the purposes of comfort being shown in FIG. 6. In this case, in particular from a comparison of the views in FIGS. 5 and 6 it may be seen that, starting from the working position, with a rotational movement (according to the arrow B) of the comfort section 122, a translational displacement (toward the direction of displacement C) is brought about of the comfort section 122 from the safety section 123, on the one hand, as well as a translational displacement (toward the direction of displacement C) of the first section 11 from the comfort section 122, on the other hand (see FIGS. 5 and 6). This result is produced by the oblique surfaces 11', 12', 13' and 14'. In this case, a portion of the oblique surfaces—in particular the first oblique surfaces 11' and the fourth oblique surfaces 14'—may be provided as helical oblique surfaces about the substantially cylindrical path (at the respective point) of the first section 11, on the one hand, and of the second section 12 and/or of the comfort section 122, on the other hand, in particular the respective opposing surfaces, i.e. the second oblique surfaces 12' opposing the first oblique surfaces 11' and/or the third oblique surfaces 13' opposing the fourth oblique surfaces 14' being merely designed as abutments and/or stop points, which secure the respective oblique surfaces (i.e. the first oblique surfaces 11' and the fourth oblique surfaces 14') on both sides against moving in the direction of displacement C, but in turn do not have to be of helical configuration. An example thereof is shown schematically in FIG. 4, in which on only one respective side of the rotational axis 19 the second oblique surfaces 12' and the fourth oblique surfaces 14' are shown in dotted lines arranged both in the direction of displacement C above the first oblique surfaces 11' and/or fourth oblique surfaces 14' and in the direction of displacement C below the first oblique surfaces 11' and/or fourth oblique surfaces 14'. The helical first and/or fourth oblique surfaces 11', 14' in this embodiment are retained in the direction of displacement C, between the projections forming the second and/or third oblique surfaces 12', 13'. As a result, it is ensured that a predetermined relative rotational position (in the present case between the first section 11 and the comfort section 122 and/or between the comfort section 122 and the third section 13) is linked with a predetermined relative translational position.

Furthermore, in particular the first oblique surfaces 11' and the fourth oblique surfaces 14' run in opposing directions, so that the maximum travel of the first section 11 in the direction of displacement C, with a relatively compact design of the headrest 4, is maximized as far as possible toward this direction of displacement C.

An outward movement, counter to the direction of displacement C, of the first section 11, moving via dead travel, is prevented due to a blocking device 30, not shown, in the form of teeth in the region of the third and fourth oblique surfaces 13', 14'. To this end, at least one pair consisting of a helical oblique surface and a non-helical oblique surface is provided with teeth, i.e. of, for example, three oblique surfaces distributed over the periphery only one oblique surface is provided with teeth. In the embodiment, (see FIG. 4) it is further provided that the toothed surface, for example of the third oblique surface 13' may be lifted away, for example by means of a blocking pin 31 optionally pretensioned by a spring, from the toothed engagement provided in the normal case with the fourth oblique surface 14 and thus the blocking action of the blocking device 30 may be cancelled. As a result—in particular in the event of adjusting the comfort, i.e. with the locked spring 20—it is possible, by manual actuation of the blocking pin 31 and by pressing onto the first section 11, to achieve an adjustment of the first section 11 counter to the direction of displacement C.

The manual adjustment of the first section 11 via an actuation of the blocking pin 31 is possible according to the invention by means of an actuation element 40, 40' which may be arranged symmetrically. This situation is shown in FIGS. 7 and 8. In FIGS. 7 and 8 in each case a plan view is shown of the third section 13 of the headrest 4 from a direction in the installed position from the rear. This means that the actuation element 40 in FIG. 7 is arranged on the left-hand side of a central plane 41 extending substantially vertically and substantially parallel to the rotational axis 19 and in that the actuation element 40' in FIG. 8 is arranged on the right-hand side of the central plane 41. As a result, the actuation of the blocking pin 31 may take place by means of the actuation elements 40, 40' in a symmetrical manner, although the blocking pin 31 is arranged asymmetrically relative to the central plane 41 and although substantially the entire interior of the headrest 4 is largely configured to be asymmetrical relative to the central plane 41. A pair of headrests, which for example may be attached in a vehicle to two adjacent seats of a row of seats, may thus according to the invention be configured in a simple manner such that although the headrests and/or the essential internal parts thereof are configured to be asymmetrical relative to the central plane 41 nevertheless either both actuation elements 40, 40' are provided arranged (symmetrically) on each headrest or, however, only the left-hand actuation element 40 is arranged on the left-hand headrest and only the right-hand actuation element 40' is arranged on the right-hand headrest (or vice versa), i.e. a symmetrical arrangement is possible. For actuating and/or moving the blocking pin 31 (for canceling the blocking substantially counter to the direction of displacement C) in a preferred manner it is provided that an oblique surface mechanism 42, shown in FIGS. 7 and 8 schematically in each case in the lower part of the figures, is arranged such that a (pressing) movement carried out by one of the actuation elements 40, 40' in the direction of the central plane 41 leads to the movement of the blocking pin 31.

LIST OF REFERENCE NUMERALS

1 Vehicle seat
2 Seat part
3 Backrest
4 Headrest
5 Retaining bar
11 First section of the headrest
11' First oblique surface
12 Second section of the headrest
12' Second oblique surface
13 Third section of the headrest
13' Third oblique surface
14' Fourth oblique surface
19 Rotational axis
20 Leg spring
21, 22 Contact points
30 Blocking device
31 Blocking pin
40, 40' Actuation element
41 Central plane
42 Oblique surface mechanism
122 Comfort section
123 Safety section
Arrow B Rotational direction of the hollow cylinder
Arrow C Shift/displacement of the padded body

The invention claimed is:

1. A headrest for a vehicle seat, comprising:
at least one first section that is configured to be oriented towards a head of a seat occupant;
a second section;
a third section, wherein the second section is arranged substantially between the first section and the third section, wherein the first section is configured to be displaced in a direction of displacement, due to an effect of a relative displacement of the second section from a working position into a safety position in an event of an accident and into a comfort position, the direction of displacement being in a direction of the head of the seat occupant; and
a blocking device configured to block or minimize displacement of the first section counter to the direction of displacement,
wherein the blocking device is asymmetrical in relation to a central plane of the headrest extending substantially in a vertical manner and a parallel manner in relation to the direction of displacement in a built-in position of the headrest, and
wherein the blocking device is configured to be actuated by an actuation element which is able to be arranged symmetrically in relation to the central plane.

2. The headrest as claimed in claim 1, wherein the actuation element is a pressure actuation element.

3. The headrest as claimed in claim 1, wherein the actuation element is a push button.

4. The headrest as claimed in claim 1, wherein the blocking device has at least one blocking pin which is actuatable by the actuation element for unblocking the blocking device, wherein the actuation element is configured to actuate the blocking pin with a movement of the blocking pin being provided substantially counter to the direction of displacement.

5. The headrest as claimed in claim 4, wherein the blocking pin in a normal case is provided pretensioned by a spring for blocking the blocking device.

6. The headrest as claimed in claim 4, wherein movement of the blocking pin is provided by the actuation element via an oblique surface mechanism.

7. The headrest as claimed in claim 1, wherein the second section has a comfort section and a safety section,
wherein the comfort section is able to be moved away from a position of the safety section, for adjusting comfort, by starting from a position corresponding to the working position of the first section.

8. The headrest as claimed in claim 7, wherein the comfort section is configured to be adjustable for adjusting comfort, into a position corresponding to the safety position of the first section independently of the position of the safety section.

9. The headrest as claimed in claim 1, wherein the relative movement of the first and second sections is a rotation about a rotational axis substantially parallel to the direction of displacement.

10. The headrest as claimed in claim 9, wherein the first section has at least one first oblique surface and the second section has at least one second oblique surface,
wherein the first oblique surface, the second oblique surface, or a combination thereof extends substantially helically about the rotational axis and, with a relative movement of the second section about the rotational axis, effects a movement of the first section in the direction of displacement.

11. The headrest as claimed in claim 10, wherein the third section has at least one third oblique surface and the second section has at least one fourth oblique surface,
   wherein the third oblique surface, the fourth oblique surface, or a combination thereof extends substantially helically about the rotational axis and, with a relative movement of the second section about the rotational axis effects a movement of the second section in the direction of displacement.

12. The headrest as claimed in claim 11, wherein the blocking device has teeth in a region of the third oblique surface and the fourth oblique surface.

13. The headrest as claimed in claim 11, wherein the second section has a comfort section and a safety section,
   wherein the comfort section is able to be moved away from a position of the safety section, for adjusting comfort, by starting from a position corresponding to the working position of the first section, and
   wherein the fourth oblique surface is provided on the comfort section.

* * * * *